(12) United States Patent
Nagahara

(10) Patent No.: US 6,343,025 B1
(45) Date of Patent: Jan. 29, 2002

(54) SWITCHING CONVERTER FOR GENERATING A DRIVING SIGNAL

(75) Inventor: Kiyokazu Nagahara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/670,444

(22) Filed: Sep. 26, 2000

(30) Foreign Application Priority Data

Sep. 28, 1999  (JP) ............................................. 11-275195

(51) Int. Cl.$^7$ ................................................ H02M 1/12
(52) U.S. Cl. .......................................... 363/49; 363/16
(58) Field of Search .............................. 363/16, 49, 50, 363/55, 56.01, 98, 56.02, 56.03, 56.06, 56.07; 323/901

(56) References Cited

U.S. PATENT DOCUMENTS 4,586,120 A * 4/1986 Malik et al. ................... 363/49

* cited by examiner

Primary Examiner—Peter S. Wong
Assistant Examiner—Gary L. Laxton
(74) Attorney, Agent, or Firm—Frommer Lawrence & Haug LLP; William S. Frommer

(57) ABSTRACT

A non-control detection protecting circuit is prevented from malfunctioning when a switching converter is started. A latch control circuit 40 makes a non-control detection discrimination signal SDT invalid during a soft start operation. Moreover, a driving circuit 33 stops driving signals SD1 and SD2 for a predetermined period after it is detected that an overload state is set based on the non-control detection discrimination signal SDT, and a soft start circuit 35 is then controlled to carry out the soft start operation. Thus, an intermittent operation is carried out. Furthermore, the soft start control circuit 35 is controlled by the intermittent operation control circuit 50, resulting in the completion of the discharge of a capacitor 36 which sets a soft start period when the soft start operation in the intermittent operation is started.

3 Claims, 8 Drawing Sheets

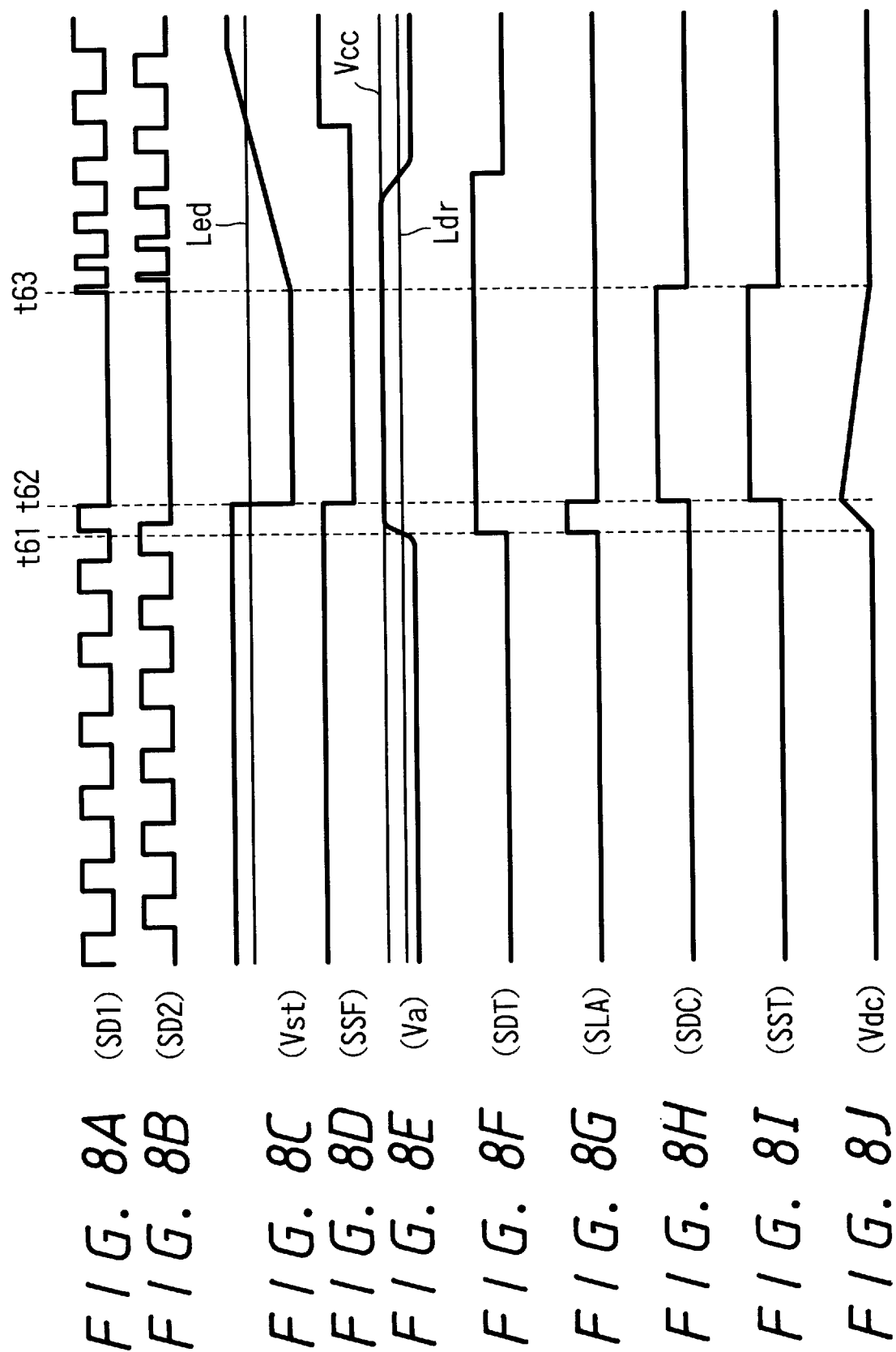

US 6,343,025 B1

SWITCHING CONVERTER FOR GENERATING A DRIVING SIGNAL

BACKGROUND OF THE INVENTION

1. Field of the Invention

The present invention relates to a switching converter. More particularly, the present invention relates to a switching converter for making a non-control detection discrimination signal invalid in an overload state during a soft start operation, thereby preventing a malfunction to carry out a correct protecting operation.

2. Description of the Related Art

An example of a switching converter according to a conventional embodiment will be simply described with reference to the drawings. FIG. 1 shows the structure of a switching converter, for example, a current resonance bridge converter.

In FIG. 1, MOS field effect transistors 12 and 13 are mutually switching-driven and a voltage is induced to a secondary will Ns of a transformer 15 through the current resonance of a series resonance circuit which comprises inductances L15a and L15b of the transfer 15 and a capacitor 16. A DC output voltage Vs obtained by rectifying and smoothing the voltage is supplied to a load 20 and an error amplifier 21.

A photocoupler 23 is driven by the error amplifier 21 in response to a difference between the Dc output voltage Vs and a reference voltage Vref. Consequently, the frequency of an oscillation signal Sosc generated by the oscillating circuit 30 is varied. In a driving circuit 33, moreover, driving signals SD1 and SD2 are generated based on the oscillating signal Sosc and are supplied to the transistors 12 and 13 so that the DC output voltage Vs is controlled to be equal to the reference voltage Vref.

When the operation of the switching converter is started, a capacitor 36 connected to a soft start control circuit 35 is charged and a soft start control signal SFC corresponding to the voltage level of a terminal voltage Vst of the capacitor 36 is generated by the soft start control circuit 35 and is supplied to the oscillating circuit 30.

Moreover, if the positive polarity terminal of a comparator 28 is referred to as a connecting point Q, an overload state is brought and the voltage level of the DC output voltage Vs is reduced. Consequently, a discrimination voltage Va on the point Q becomes lower than a non-control discrimination reference voltage Vdr. For this reason, it is possible to judge whether it is the overload state or not, based on a non-control detection signal SLA sent from the comparator 28 in a latch control circuit 40 as an oscillation driving control means. If it is judged that it is the overload state, a driving control signal SDC is supplied to the driving circuit 33 to stop the generation of the driving signals SD1 and SD2 in the driving circuit 33. Consequently, the operation of the switching converter can be stopped during the overload.

In a conventional current resonance type converter, the oscillation frequency of the oscillating circuit 30 is increased through the soft start control signal SFC sent from the soft start control circuit 35 during starting. Consequently, an operation is started with a high primary resonance impedance and the transistors 12 and 13 operate in a safe operation region.

FIG. 2 shows the operation of each portion during the starting. FIG. 2A shows the driving signal SD1, FIG. 2B shows the driving signal SD2, FIG. 2C shows the terminal voltage Vst of the capacitor 36 for determining a soft start period, and FIG. 1D shows the discrimination voltage Va of the connecting point Q which is varied according to the DC output voltage Vs.

When the switching converter is started at a time t81, the supply of the driving signals SD1 and SD2 are started as shown in FIGS. 2A and 2B. Moreover, the charging operation of the capacitor 36 is started so that the terminal voltage Vst of the capacitor is raised as shown in FIG. 2C. Furthermore, the discrimination voltage Va on the point Q shown in FIG. 8D is also raised.

Then, the DC output voltage Vs is lower than the output reference voltage Vref at a time t82 immediately after the soft start is started. Therefore, a phototransistor 23b is in a cut-off state. However, a voltage Vcc is applied to the point Q through a constant current source 27. Therefore, the discrimination voltage Va reaches a voltage level Ldr of the reference voltage Vdr. For this reason, this is erroneously recognized as the overload state in a latch control circuit 40. There is a fear that the transistors 12 and 13 which should properly continue the operation might be stopped.

In order to solve the above-mentioned problem, a capacitor 28y for preventing malfunction is connected to the connecting point Q and the capacitor 28y is charged when the switching converter is started. Thus, the discrimination voltage Va is controlled so as not to exceed the voltage level Ldr for a soft start period. More specifically, the capacity of the capacitor 28y should be determined such that the charging time of the capacitor 28y becomes longer than that of the capacitor 36.

However, the capacities of the capacitor 28y and the capacitor 36 for determining the soft start period are different great individually. Therefore, it is a matter of course that there is a great difference individually in the charging period of the capacitor 28y and the soft start period which is the charging period of the capacitor 36. For this reason, the charging time of the capacitor 28y should be maintained to be sufficiently long in order to surely prevent the malfunction of the latch control circuit 40. Consequently, the charging period of the capacitor 28y remains after the soft start period and the overload state which should be properly detected cannot be detected after the soft start period. Therefore, a timing for supplying the non-control detection signal SLA is delayed. Accordingly, it is not easy to determine the capacity of the capacitor 28y while maintaining a balance with the charging time of the capacitor 36.

The invention solves such a conventional problem and particularly proposes that the malfunction of the switching converter is prevented and a correct protecting operation is carried out.

SUMMARY OF THE INVENTION

In order to solve the above-mentioned problem, a first aspect of the present invention is directed to a switching converter for switching a transistor in response to a driving signal sent from oscillation driving means to obtain a desirable DC output voltage, comprising:

overload detecting means for detecting an overload state and outputting a non-control detection discrimination signal;

soft start control means for controlling the frequency of the oscillation signal of the oscillation driving means in a soft start period which is a predetermined period and starts during starting-up, thereby carrying out a soft start operation for raising gradually the DC output voltage to a desirable voltage level; and oscillation driving control means for controlling the oscillation driving means based on the non-control detection discrimination signal to stop the driving signal, thereby carrying out a protecting operation and making the non-control detection discrimination signal invalid during the soft start operation.

Moreover, a second aspect of the present invention is directed to the switching converter characterized in that the oscillation driving control means stops the driving signal for a predetermined period after the overload state is detected, based on the non-control detection discrimination signal, and then controls the soft start control means, thereby carrying out the soft start operation to executing an intermittent operation.

Furthermore, a third aspect of the present invention is directed to the switching converter characterized in that the soft start control means sets the soft start period by charging a capacitor, and the oscillation driving control means discharges of the capacitor when the soft start operation in the intermittent operation is started.

BRIEF DESCRIPTION OF THE DRAWINGS

FIG. 8 is a diagram showing the operation waveform of each portion according to a second embodiment.

DETAILED DESCRIPTION OF THE PREFERRED EMBODIMENTS

Figure 1:
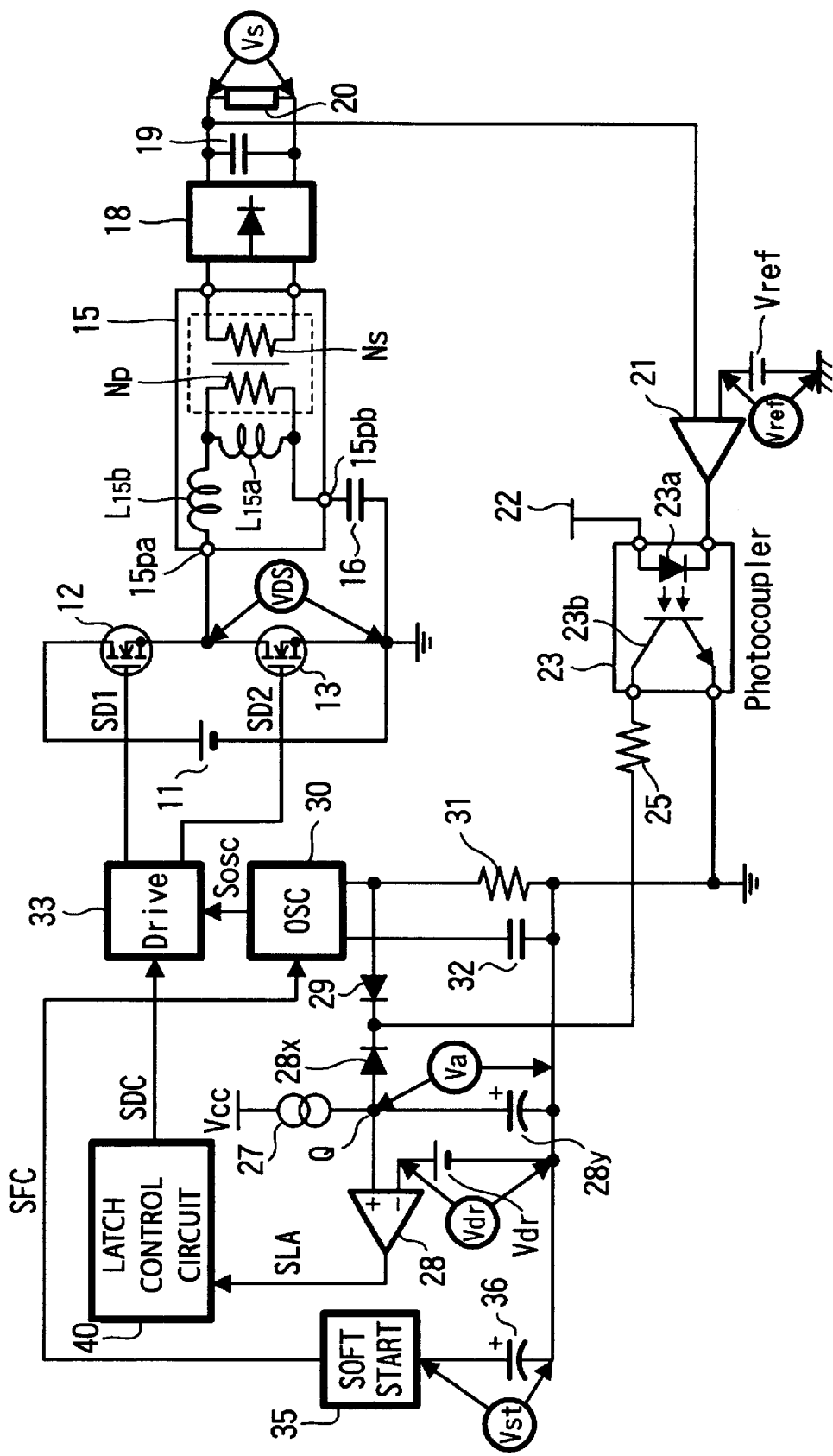
FIG. 1 is a diagram showing an example of a circuit structure according to the conventional art.
Figure 2:
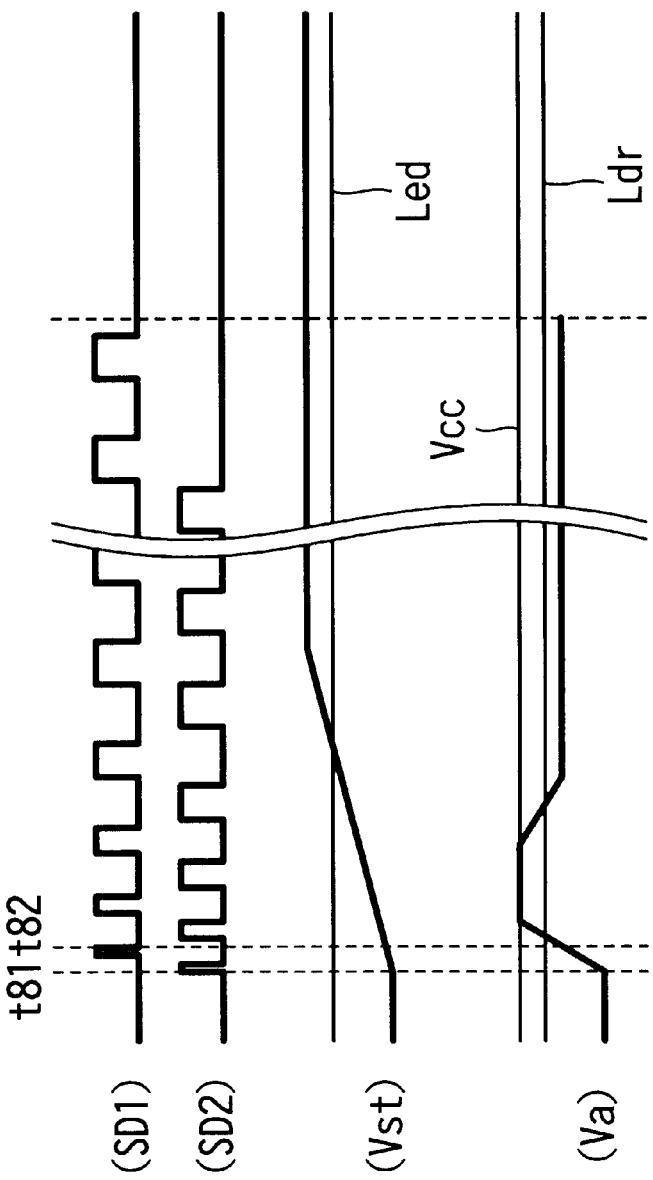
FIG. 2 is a diagram showing the operation waveform of each portion according to the conventional art.
Figure 3:
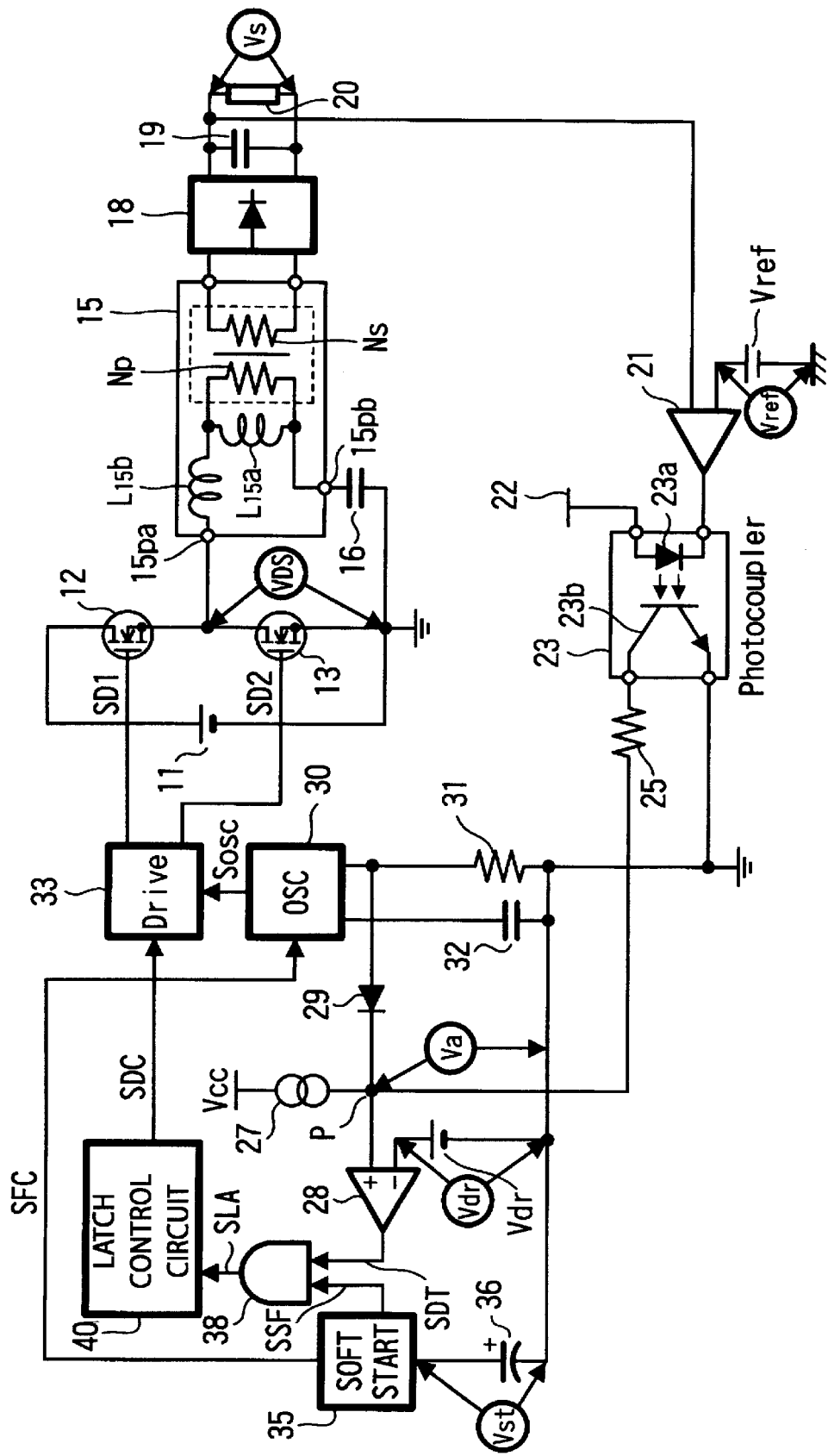
FIG. 3 is a diagram showing an example of a circuit structure according to a first embodiment.

Next, a switching converter according to a first embodiment of the present invention will be described in detail with reference to the drawings. FIG. 3 shows the structure of the switching converter, for example, a current resonance bridge converter.

The positive electrode terminal of a DC input voltage 11 is connected to the drain of a transistor 12, which is a MOS field effect transistor, for example, and is to be used as a switching element, and the negative electrode terminal of the DC input voltage 11 is grounded.

The source of the transistor 12 is connected to the drain of a transistor 13, and the source of the transistor 13 is grounded. A terminal 15pa of a primary coil Np of a transformer 15 is connected to the connecting point of the source of the transistor 12 and the drain of the transistor 13, and a terminal 15pb of the primary coil Np is connected to one of terminals of a capacitor 16. Moreover, the other terminal of the capacitor 16 is grounded and a series resonance circuit is formed by the primary coil Np of the transformer 15 and the capacitor 16. The transformer 15 has an inductance L15a based on a transformer coil and a leakage inductance L15b based on a leakage flux.

The gates of the transistors 12 and 13 are connected to a driving circuit 33 which will be described below, and the transistors 12 and 13 are driven to be alternately turned to ON or OFF in response to drive signals SD1 and SD2 sent from the driving circuit 33.

The AC input terminal of a diode bridge 18 is connected to a secondary coil Ns of the transformer 15, and a smoothing capacitor 19 is connected between the positive and negative electrode terminals of the diode bridge 18. The diode bridge 18 and the smoothing capacitor 19 rectify and smoother a voltage induced to the secondary coil Ns of the transformer 15 and a DC output voltage Vs thus obtained is supplied to a load 20 and an error amplifier 21.

An output reference voltage Vref for controlling the voltage level of the DC output voltage Vs is supplied to the error amplifier 21, and an light emitting diode 23a of a photocoupler 23 is driven based on a difference between the DC output voltage Vs and the output reference voltage Vref.

The emitter of a phototransistor 23b of the photocoupler 23 is grounded and is connected to a constant current source 27, the positive electrode input terminal of a comparator 28 and the cathode of a diode 29 through a resistor 25. The constant current source 27 is driven with a higher voltage Vcc than a non-control discrimination reference voltage Vdr which will be described below. For simplicity of the description, the cathode side of the diode 29 is set to be the connecting point P.

The anode of the diode 29 is connected to an oscillating circuit 30 and is grounded through a resistor 31. Moreover, a capacitor 32 is connected to the oscillating circuit 30.

The lowest frequency of an oscillation signal Sosc supplied from the oscillating circuit 30 is set by the resistor 31 and the capacitor 32. Moreover, when the light emitting diode 23a of the photocoupler 23 is driven according to the difference between the DC output voltage Vs and the voltage Vref, the transistor 23b is also driven so that an impedance between the connecting point P and a ground is changed according to the difference between the DC output voltage Vs and the voltage Vref. Consequently, the impedance between the anode side of the diode 29 and the ground is also changed. When the same impedance is reduced, the frequency of the oscillation signal Sosc is controlled to be increased and the oscillation signal Sosc is supplied to a driving circuit 33. Moreover, the frequency is also controlled by a soft start control signal SFC supplied from a soft start control circuit 35 during starting.

Oscillation driving means is constituted by the oscillating circuit 30 and the driving circuit 33. The driving circuit 33 supplies driving signals SD1 and SD2 to the gates of the transistors 12 and 13 based on the oscillation signal Sosc supplied from the oscillating circuit 30. Consequently, the driving frequencies of the transistors 12 and 13 are varied according to the difference between the DC output voltage Vs and the output reference voltage Vref and the Dc output voltage Vs is controlled to be equal to the output reference voltage Vref. In the driving circuit 33, moreover, the supply of the driving signals SD1 and SD2 is stopped based on a driving signal SDC sent from a latch control circuit 40 which will be described below.

A non-control discrimination reference voltage Vdr is supplied to the negative electrode terminal of the comparator 28. The comparator 28 compares a discrimination voltage Va on the connecting point P with the non-control discrimination reference voltage Vdr and supplies a non-control detection discrimination signal SDT indicative of the result of the comparison to a logical operation circuit 38. Moreover, a soft start period signal SSF is supplied from a soft start control circuit 35 which will be described below to the logical operation circuit 38.

A capacitor 36 is connected to the soft start control circuit 35 and is charged during the start of the operation of the switching converter. At this time, a soft start period signal SSF indicative of a soft start period, which is a period that the terminal voltage Vst of the capacitor 36 is charged to a predetermined voltage level, is generated and supplied to the logical operation circuit 38. Moreover, the soft start control signal SFC is supplied to the oscillating circuit 30 and the oscillating circuit 30 is controlled during the starting.

The logical operation circuit 38 carries out the logical operation of the non-control detection discrimination signal SDT and the soft start period signal SSF makes the non-control detection discrimination signal SDT invalid for the soft start period and supplies a signal corresponding to the non-control detection discrimination signal SDT as a non-control detection signal SLA to the latch control circuit 40 for a period other than the soft start period.

The latch control circuit 40 as an oscillation driving control means generates and holds a driving control signal SDC for stopping the supply of the driving signals SD1 and SD2 in the driving circuit 33 when the voltage level of the discrimination voltage Va on the connecting point P is lower than that of the non-control discrimination reference voltage Vdr based on the non-control detection signal SLA sent from the logical operation circuit 38.

Figure 4:
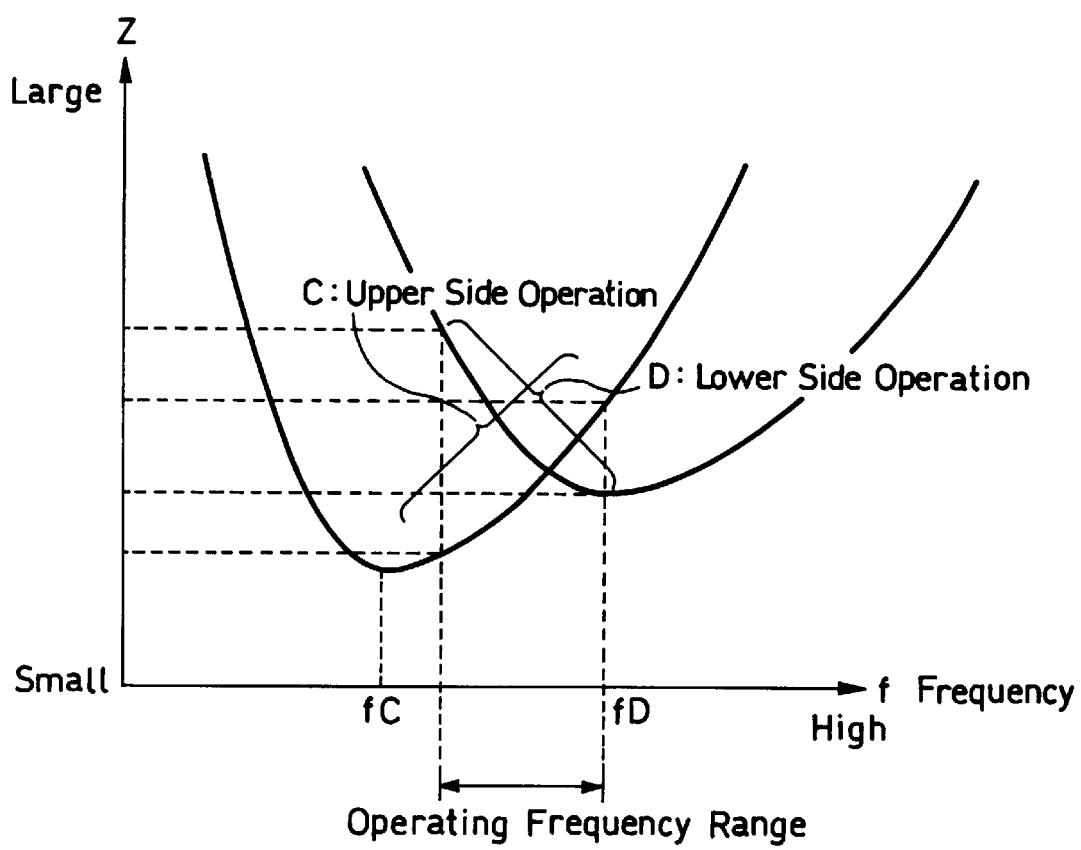
FIG. 4 is a chart showing the relationship of a frequency and an impedance.

Next, the operation will be described. In the switching converter, an upper side operation is carried out by using, as an operating frequency, the frequency range higher than the resonance frequency fC of the series resonance circuit constituted by the transformer 15 and the capacitor 16 shown in FIG. 4, that is, the upper side of a primary resonance impedance curve of the transformer 15 shown in FIG. 4C.

In this case, when the DC output voltage Vs is higher than the output reference voltage Vref, the frequencies of the driving signal SD1 and SD2 are set to be high. Consequently, the primary resonance impedance of the transformer 15 is increased so that an exciting current is reduced and the DC output voltage Vs is controlled to be equal to the output reference voltage Vref. Moreover, when the DC output voltage Vs is lower than the output reference voltage Vref, the frequency of the oscillating signal Sosc is reduced and the frequencies of the driving signals SD1 and SD2 are set to be low. Consequently, the DC output voltage Vs is controlled to be equal to the output reference voltage Vref.

In the case of a low frequency range that the operating frequency shown in FIG. 4D is lower than the series resonance frequency fD, a lower side operation is carried out.

Figure 5:
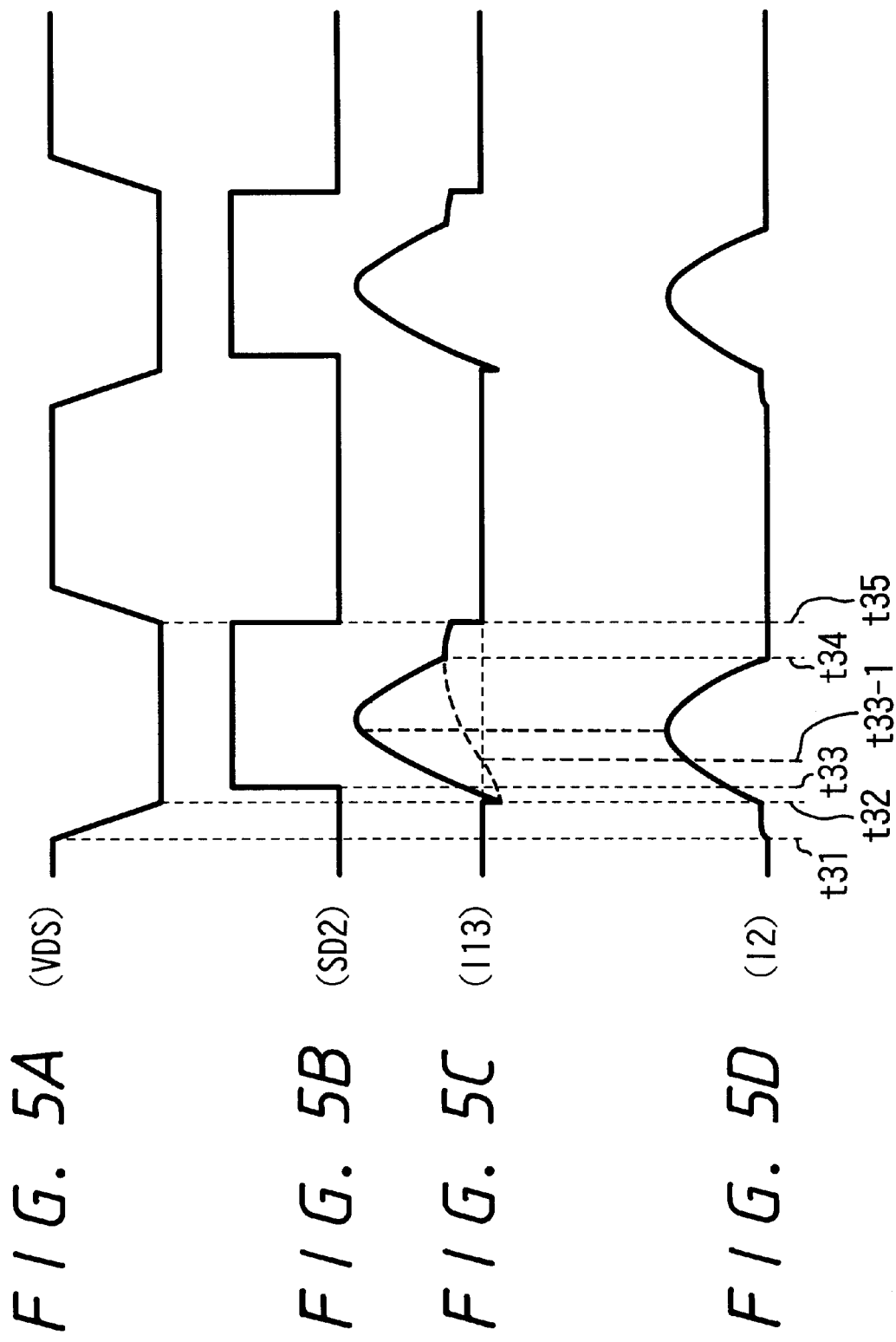
FIG. 5 is a diagram showing the signal waveform of each portion in a normal operation.

FIG. 5 shows a signal waveform obtained during a normal operation. The transistors 12 and 13 repeat the same operation each having a phase inverted by each other. One of the operation waveforms is obtained by shifting the other operation waveform by a half period and the positive and negative signs are reversed. Accordingly, only the operation on the transistor 13 side will be described and the description of the transistor 12 side will be omitted.

A terminal voltage between the drain and the source of the transistor 13 shown in FIG. 5A is represented as VDS, a driving signal for driving the transistor 13 shown in FIG. 5B is represented as SD2, a current flowing to the transistor 13 shown in FIG. 5C is represented as I13, and a current flowing to the secondary coil Ns of the transformer 15 shown in FIG. 3D is represented as I2.

When the transistor 12 is brought into an OFF state at a time t31, a charging current supplied to a capacity between the drain and source terminals of the transistor 12 flows to the capacitor 16, the resonance inductance 15b and the DC input voltage 11. Moreover, a discharging current flows from the capacity between the drain and source terminals of the transistor 13. Therefore, the voltage level of the terminal voltage VDS shown in FIG. 5A is dropped.

When the discharge of the capacity between the terminals of the transistor 12 and the charge of the capacity between the terminals of the transistor 13 are completed at a time t32, the charging current such as current I13 shown in FIG. 3C flows to the capacitor 16 in a commutation mode through a built-in diode (not shown) of the transistor 13.

When the charge of the capacitor 16 is completed at a time t33, the discharging current flows from the capacitor 16 through the transformer 15 and the transistor 13. As shown in FIG. 3B, moreover, the driving signal SD2 is set to have the high level "H". Therefore, the transistor 13 is turned on. The period from time t32 to time t34 is a power transmission period for which the current flowing to the primary coil Np of the transformer 15 is excited. Consequently, the current I2 flows to the secondary coil Ns side as shown in FIG. 5D.

At a time t33-1, the current flowing to the built-in diode (not shown) of the transistor 13 is set to O. As described above, the transistor 13 is turned on at the time t33. Therefore, the current I13 flowing to the transistor 13 has a positive polarity before time t35.

Moreover, the period from time t34 to time t35 at which the transistor 13 is turned off is a power non-transmission period for which the resonance current to be supplied to the series resonance circuit comprising the resonance inductance 15b of the transformer 15 and the capacitor 16 flows into the transistor 13.

Figure 6:
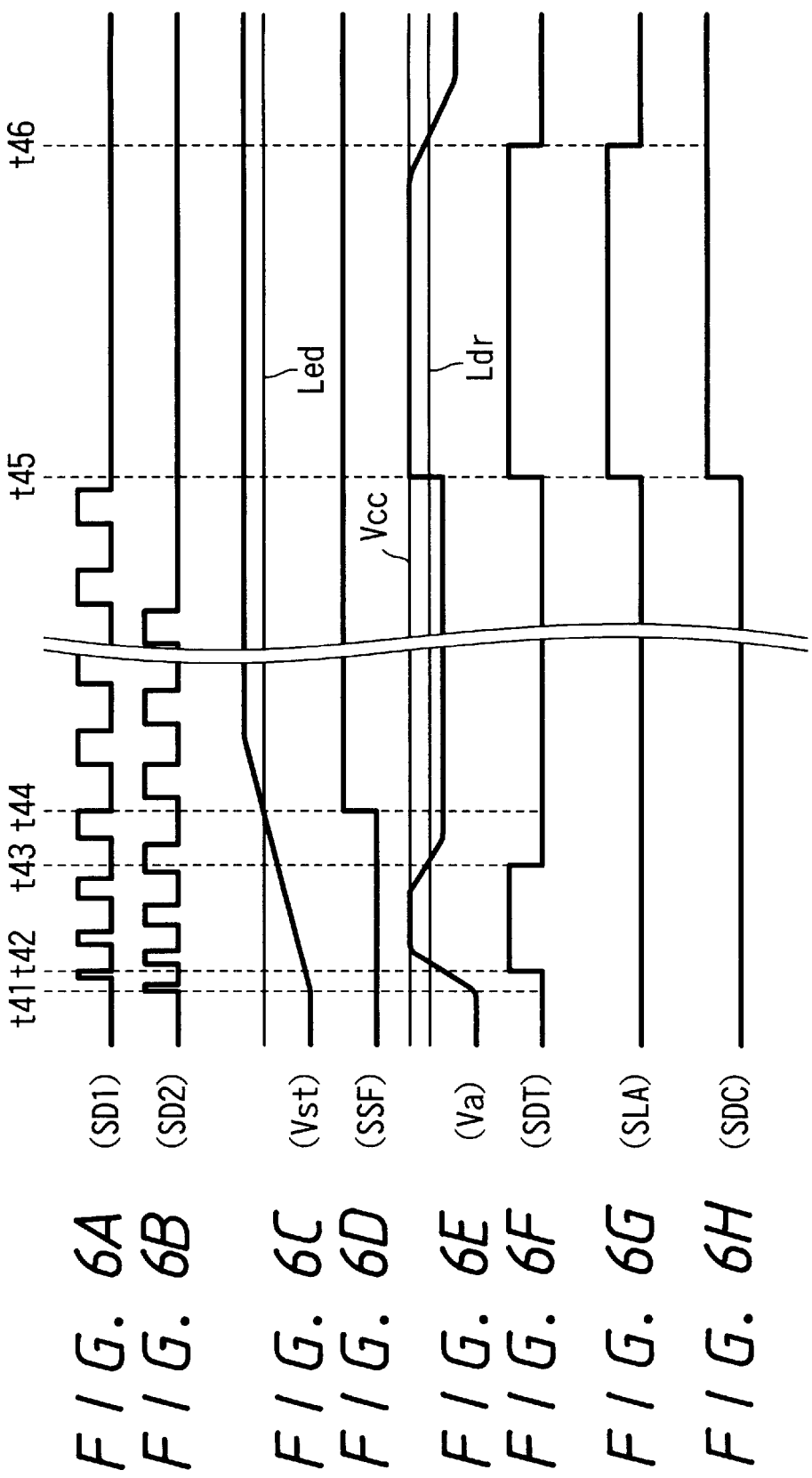
FIG. 6 is a diagram showing the signal waveform of each portion according to the first embodiment.

Next, the operation of the switching converter during starting and the overpower protecting operation will be described with reference to FIG. 6.

When the operation of the switching converter is started at a time t41, the capacitor 36 connected to the soft start control circuit 35 is started to be charged so that the terminal voltage Vst is raised as shown in FIG. 6C. The start control signal SFC corresponding to the voltage Vst is supplied to the oscillating circuit 30. Moreover, the soft start control circuit 35 discriminates the voltage level of the terminal voltage Vst and supplies the soft start period signal SSF shown in FIG. 6D which indicates whether the terminal voltage Vst reaches a predetermined voltage level Led, that is, whether the soft start period is completed. For the soft start period before the terminal voltage Vst reaches the predetermined voltage level Led at a time t44, for example, the soft start period signal SSF is generated to have a low level "L". The soft start period signal SSF is supplied to the logical operation circuit 38.

The oscillation signal Sosc supplied from the oscillating circuit 30 is set to have the highest oscillating frequency within the operating frequency range in response to the soft start control signal SFC sent from the soft start control circuit 35. Therefore, the driving signals SD1 and SD2 shown in FIGS. 6A and 6B are also set to have the highest frequency within the operating frequency range. At this time, the resonance impedance is high. Therefore, a drain current flowing to the transistors 12 and 13 is set to have a small magnitude. Consequently, the transistors 12 and 13 can be driven within the safe operating region when the operation is started. Moreover, the DC output voltage Vs is gradually raised to the output reference voltage Vref when the operation is started. Therefore, a light emitting section 23a of the photocoupler 23 is set in the cut-off state until the DC output voltage Vs is equal to the output reference voltage Vref.

For this reason, the non-control detection discrimination signal SDT sent from the comparator 28 shown in FIG. 6F is set to have a high "H" level, for example, from the time t42 at which the discrimination voltage Va on the connecting point P shown in FIG. 6E reaches the voltage level Ldr of the non-control discrimination reference voltage Vdr after the operation is started to the time t43 at which the discrimination voltage Va on the connecting point is dropped to the voltage level Ldr.

The logical operation circuit 38 is constituted by an AND gate, for example, and generates AND of the non-control detection discrimination signal SDT sent from the comparator 28 and the soft start period signal SSF sent from the soft start control circuit 35. The AND is supplied as the non-control detection signal SLA shown in FIG. 6G to the latch control circuit 40.

The latch control circuit 40 stops the outputs of the driving signals SD1 and SD2 sent from the driving circuit 33 when the non-control detection signal SLA is in the high level "H", for example. When the soft start period signal SSF is in the low level "L", for example, the non-control detection discrimination signal SDT sent from the comparator 28 is made invalid during the soft start period. Therefore, the non-control detection signal SLA becomes the low level "L". Accordingly, even if an abnormality is detected during the soft start period so that the non-control detection discrimination signal SDT sent from the comparator 28 is changed from the low level "L" to the high level "H", the operation can be started correctly.

Next, the impedance of the load 20 is dropped to become the overload state and the leakage inductance of the transformer 15 is changed so that the resonance frequency becomes higher than the operating frequency at a time t45, the upper side operation is changed into the lower side operation. In this case, much power is supplied to the load 20. Therefore, when the oscillation signal Sosc is reduced, the resonance impedance on the primary side is increased so that the exciting current is reduced. Consequently, the DC output voltage is further dropped so that the light emitting diode 23a of the photocoupler 23 is brought into the cut-off state. At this time, the discrimination voltage Va on the connecting point P is a voltage Vcc higher than the non-control discrimination reference voltage Vdr. Therefore, the non-control detection discrimination signal SDT sent from the comparator 28 is becomes the high level "H", for example, as shown in FIG. 6F. Moreover, since the soft start period is completed, the soft start period signal SSF becomes the high level "H", for example, as shown in FIG. 6D. Consequently, the non-control detection signal SLA shown in FIG. 6G becomes the high level "H", for example, in a timing in which the non-control detection discrimination signal SDT becomes the high level "H", for example. Therefore, the driving control signal SDC shown in FIG. 6H is generated and output by the latch control circuit 40. Consequently, the output of the driving signals SD1 and SD2 is stopped. Thus, the operation of the switching converter can be completed at the time t45 that the overload state is set.

In the first embodiment described above, when the overload state is set, the state in which the operation of the switching converter is completed is maintained. Therefore, even if the overload state is eliminated at a time t46, the operation for starting the operation of the switching converter again should be carried out again to operate the switching converter.

Figure 7:
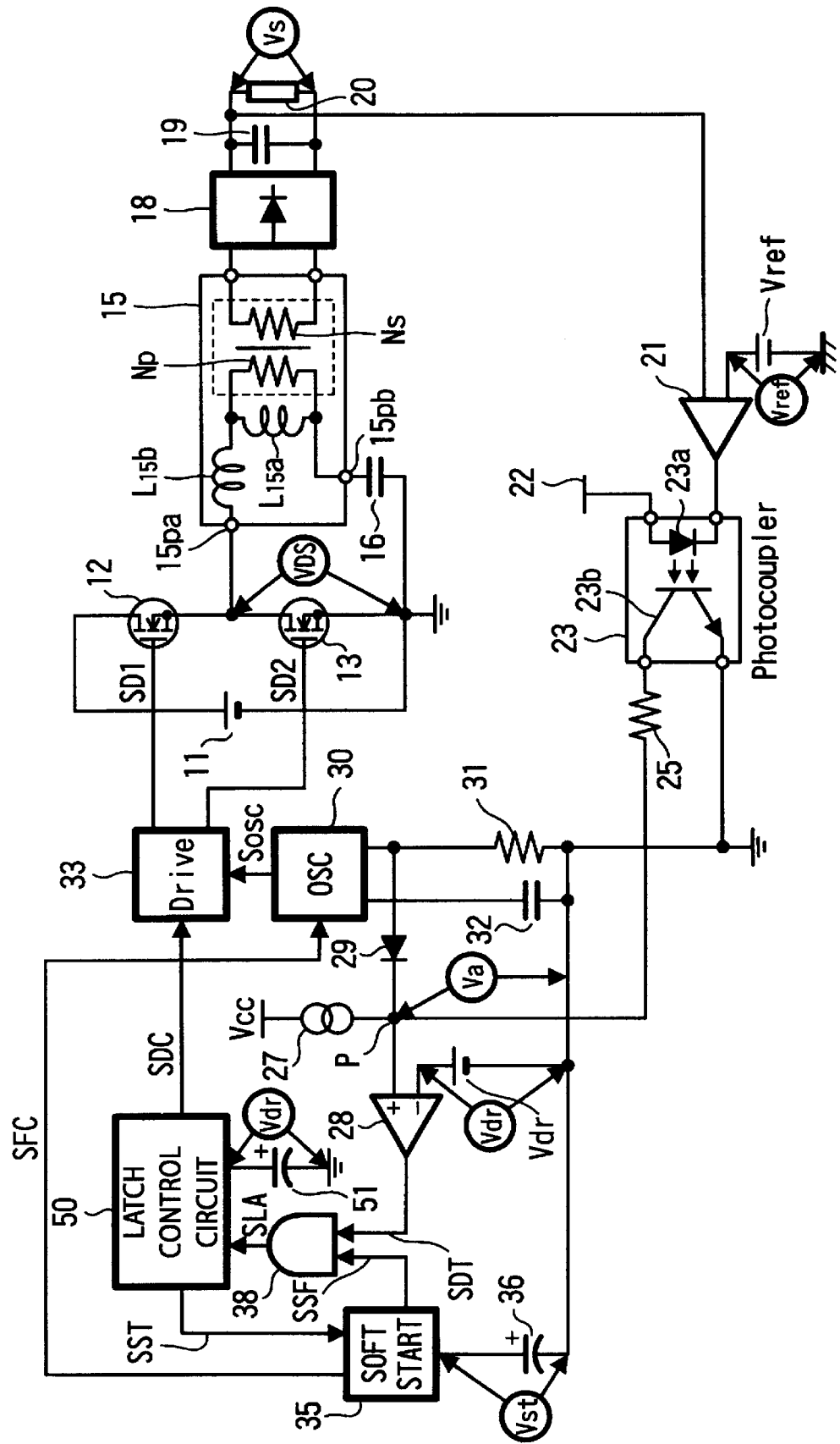
FIG. 7 is a diagram showing an example of a circuit structure according to a second embodiment.

A second embodiment of a switching converter will be described with reference to FIG. 7. The operation of switching converter can be stopped when the overload state is set and can be automatically performed when the overload state is eliminated In FIG. 7, corresponding portions to those in FIG. 3 have the same reference numerals and detailed description there will be omitted.

In the second embodiment, an intermittent operation control circuit 50 is connected to a logical operation circuit 38 in place of a latch control circuit 40. At the same time that a soft start starting signal SST is supplied from the intermittent operation control circuit 50 to the soft start control circuit 35, a driving control signal SDC is supplied to a driving circuit 33. Furthermore, one of terminals of a capacitor 51 for setting the stop period of the intermittent operation is connected to the intermittent operation control circuit 50 and the other terminal of the capacitor 51 is grounded.

When it is detected that the overload state is set based on the non-control detection discrimination signal SDT, the capacitor 51 is charged, the soft start control circuit 35 is controlled through a stop period in which driving signals SD1 and SD2 are stopped for the discharge period of the capacitor 51 to carry out the soft start operation. Thus, the intermittent operation is carried out.

Next, the operation for starting the switching converter according to the second embodiment and the overpower protecting operation will be described with reference to FIG. 8.

When the switching converter has an overload so that a discrimination voltage Va on a connecting point P shown in FIG. 6E reaches a voltage level Ldr at a time t61, a non-control detection discrimination signal SDT shown in FIG. 8F has a high level "H". Moreover, a soft start period signal SSF shown in FIG. 8D has already had the high level "H". Therefore, a non-control detection signal SLA shown in FIG. 8G which is AND of the non-control detection discrimination signal SDT and the soft start period signal SSF becomes the high level "H". Consequently, the intermittent operation control circuit 50 starts the charge of the capacitor 51 and starts a rise in a terminal voltage Vdc of a capacitor 51 shown in FIG. 8J.

At a time t62 that the charge of the capacitor 36 is completed, that is, when a period for which the intermittent operation is stopped is started, the voltage Vdc reaches a peak. Consequently, the signal level of the soft start starting signal SST shown in FIG. 6I is changed to have the high level "H" in the intermittent operation control circuit 50. In the soft start control circuit 35, the soft start starting signal SST is changed from the low level "L" to the high level "H" so that the capacitor 36 is discharged. Consequently, a terminal voltage Vst of the capacitor 36 shown in FIG. 8C is instantaneously dropped. Thus, it is possible to obtain a sufficient soft start period after the intermittent operation is completed.

Moreover, the soft start control circuit 35 sets the signal level of the soft start period signal SSF shown in FIG. 8D to have the low level "L". The low level "L" of the soft start period signal SSF makes invalid the high level "H" of the non-control detection discrimination signal SDT shown in FIG. 8F which is the output of a comparator 28. Therefore, the low level "L" of the non-control detection signal SLA is supplied to the intermittent operation control circuit 50. Accordingly, at the same time that the corresponding driving control signal SDC shown in FIG. 8H is supplied to the driving circuit 33, the driving circuit 33 stops the supply of the driving signals SD1 and SD2 shown in FIGS. 8A and 8B to the transistors 12 and 13.

At a time t63 that the voltage Vdc is 0 due to the completion of the discharge of the capacitor 36, that is, when the intermittent operation is completed, the driving control signal SDC is changed from the high level "H" to the low level "L" in the intermittent operation control circuit 50 and is supplied to the driving circuit 33. Consequently, the supply of the driving signals SD1 and SD2 from the driving circuit 33 to the transistors 11 and 12 is started and the above-mentioned soft start operation is carried out so that the switching converter can be automatically activated again.

While the current resonance type switching converter has been described in the above-mentioned embodiment, the switching converter is not restricted to the current resonance type. Moreover, while the bridge type switching converter has been described above, the switching converter may have a half bridge type.

As described above, in the present invention, the non-control detection discrimination signal in the overload state is made invalid during the soft start operation. Consequently, the malfunction can be prevented and the correct protecting operation can be carried out. It is not necessary to prevent a drop in a discrimination voltage through a capacitor for preventing malfunction as is not similar to the conventional art. Therefore, the capacitor for preventing malfunction can be deleted. Accordingly, it is possible to abolish a work for determining a capacity of capacitor which cannot easily be carried out, and furthermore, an IC can be formed through the deletion of the capacitor to be an obstruction for the formation of an IC of a non-control detection protecting circuit.

Moreover, the switching operation is stopped and is started again by carrying out the intermittent operation of the transistor when the soft start control circuit is stopped and the DC output voltage is overloaded. Consequently, the transistor and the load can be protected, and furthermore, the switching converter can automatically be activated again.

Accordingly, the switching converter according to the present invention is very suitable for the application to a DC—DC converter, a high frequency inverter and the like.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A switching converter for generating a driving signal by using an oscillation signal through oscillation driving means and switching a transistor in response to said driving signal to obtain a desirable DC output voltage, comprising:

overload detecting means for detecting an overload state and outputting a non-control detection discrimination signal;

soft start control means for controlling the frequency of said oscillation signal of said oscillation driving means in a soft start period which is a predetermined period and starts at starting-up, thereby carrying out a soft start operation for raising gradually said DC output voltage to a desirable voltage level;

comparing means for comparing said non-control detection discrimination signal and said soft start period signal to produce a non-control detection signal based on said comparison; and oscillation driving control means for controlling said oscillation driving means based on said non-control detection signal to stop said driving signal, thereby making said non-control detection discrimination signal invalid during said soft start operation and preventing shut down of the converter.

2. The switching converter according to claim 1 wherein said oscillation driving control means stops said driving signal for a predetermined period after the overload state is detected based on said non-control detection discrimination signal, and then controls said soft start control means, thereby carrying out said soft start operation to execute an intermittent operation.

3. The switching converter according to claim 2 wherein said soft start control means sets said soft start period by charging a capacitor, and said oscillation driving control means controls said soft start control means to complete the discharge of said capacitor when said soft start operation in said intermittent operation is started.

* * * * *